United States Patent [19]

Factor

[11] 4,167,536
[45] Sep. 11, 1979

[54] ORGANOPOLYSILOXANE-PHENOLPH-THALEIN-POLYCARBONATE COPOLYMERS

[75] Inventor: Arnold Factor, Scotia, N.Y.

[73] Assignee: General Electric Company, Schenectady, N.Y.

[21] Appl. No.: 926,842

[22] Filed: Jul. 21, 1978

[51] Int. Cl.² ............... C08L 43/04; C08L 83/00
[52] U.S. Cl. .................................. 525/450; 528/25; 528/26; 528/27; 528/29; 525/474
[58] Field of Search ............... 528/11, 25, 26, 27, 528/29; 260/824 R

[56] References Cited

U.S. PATENT DOCUMENTS

| | | | |
|---|---|---|---|
| 3,022,272 | 2/1962 | Schnell et al. | 528/198 |
| 3,036,036 | 5/1962 | Howe | 528/173 |
| 3,819,744 | 6/1974 | Buchner et al. | 528/25 |
| 3,821,325 | 6/1974 | Merritt, Jr. et al. | 260/824 R |
| 3,832,419 | 8/1974 | Merritt, Jr. | 260/824 R |

*Primary Examiner*—Melvyn I. Marquis
*Attorney, Agent, or Firm*—Charles T. Watts; Joseph T. Cohen

[57] ABSTRACT

Polymeric compositions containing organosiloxane units, carbonate units and a phenolphthalein nucleus are found to be both thermally processable and possess excellent flame resistance and smoke properties.

6 Claims, No Drawings

ORGANOPOLYSILOXANE-PHENOLPH-THALEIN-POLYCARBONATE COPOLYMERS

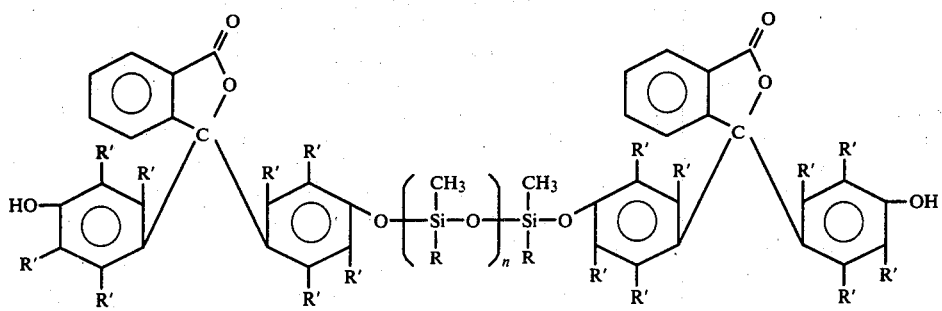

BACKGROUND OF THE INVENTION

Phenolphthalein polycarbonate resins are disclosed in U.S. Pat. No. 3,036,036 granted to Howe. These resins are notably tough and rigid and have high melting points. While this is desirable for many uses, the resins of the aforesaid patent are not easily processed. It is this problem to which this invention is directed.

BRIEF DESCRIPTION OF THE INVENTION

It has now been discovered that polymeric compositions containing a phenolphthalein nucleus, organosiloxane units and carbonate units are found to be both thermally processable and possess excellent flame resistance and smoke properties.

DETAILED DESCRIPTION OF THE INVENTION

The novel compositions of the invention are represented by the general formula

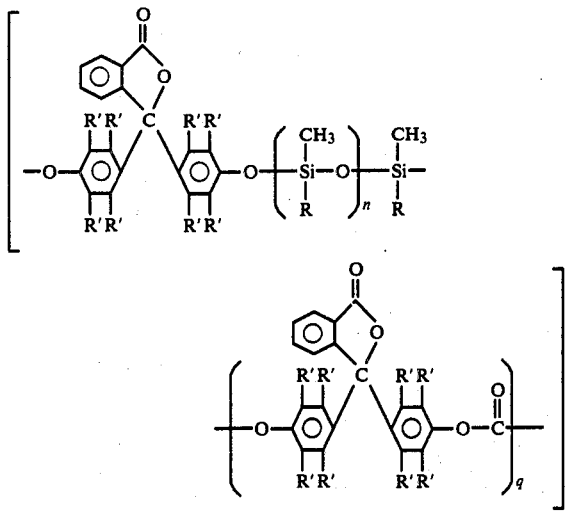

where R is independently selected from lower alkyl radicals of from 1 to 3 carbon atoms and the phenyl radical, R' is independently selected from H, and alkyl radicals having from 1 to 4 carbon atoms inclusive, chlorine, bromine, iodine and nitro, and n and q independently are whole numbers equal to at least 1.

In preparing these copolymers, one advantageously first prepares either separately or in situ, a dihydroxy terminated compound of the formula

I where R, R', and n have the meaning given above. Such compounds of formula I can be obtained by effecting reaction between a dihydric phenolphthalein nucleus compound or dihydric phenol (hereinafter so designated) of the formula

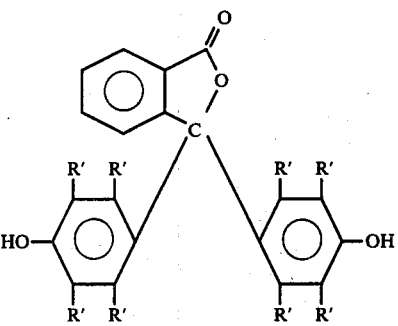

and a dichlorosiloxane (hereinafter so designated) compound of the formula

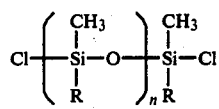

III where R, R', and n have the meanings given above. In forming the compound of formula I, at least 2 mols, e.g., from 2 to 40 or more mols, of the compound of formula II are used per mol of the dichlorosiloxane of formula III. The reaction required to form the compound of formula I is carried out at temperatures advantageously within the range of from 25°–150° C. and in the presence of a hydrohalide acceptor, such as pyridine, quinoline, tertiary amines such as tributyl amine, trimethyl amine, etc.

The dichlorosiloxane of formula III can be made by well-known methods including the controlled hydrolysis of the appropriate diorganodihalosilane, for example, dimethyldichlorosilane, or methyl phenyldichlorosilane, as more particularly described in Hyde patents U.S. Pat. Nos. 2,629,726 and 2,902,507 and in Patnode U.S. Pat. No. 2,381,366, the latter issued Aug. 7, 1945 and assigned to the same assignee as the present invention. Other means for preparing these chloropolysiloxanes well known in the art can be used and such methods, including the aforesaid Patnode patent, are intended to be incorporated and included within the scope of the disclosures of the instant invention. Preferably, the chlorinated polysiloxane is in the form of a chlorinated polydimethylsiloxane.

Among the dihydroxy compounds of formula II are 3',3'',5',5''-tetra-chlorophenolphthalein, 3',3'',5',5''-tetraiodophenolphthalein, 3',3'',5',5''-tetrabromophenolphthalein, thymolphthalein, 3,3''-dibromophenolphthalein, 3',3''-dibromo-5',5''-dimethylphenolphthalein, ortho-cresolphthalein, 3'-bromo-5',5''-dimethylphenolphthalein, dinitro-ortho-cresolphthalein, and phenolphthalein. In the above examples the hydroxyls are in the 4',4'' positions.

In forming the compounds of formula I, suitable inert solvents such as chloroform, chlorobenzene, methylene chloride, tetrachloroethane, etc., may be employed as the medium in which to conduct the reaction in amounts ranging, on a weight basis, from about 1 to 10 parts or more of the solvent per part of the mixture of the dichlorosiloxane and the dihydric phenol. The amount of hydrohalide acceptor used should be adequate to remove all the formed HCl and will depend on the proportions of the reactants. Times of the order from about 10 minutes to about 3 or more hours are usually adequate for completion of the reaction to form the compound of formula I. Anhydrous conditions are usually desirable for optimum results.

Thereafter, the compound of formula I is subjected to a phosgenation reaction by passing phosgene into the solution of the formed compound of formula I. During the phosgenation reaction, it is desirable to effect stirring of the mixture. The phosgenation is carried out until the resulting mixture by use of excess amounts of the phosgenating agent has attained the maximum viscosity, indicating that carbonation of the compound of formula I has been attained. Usual means can be employed for recovering and purifying the block copolymers such as by the use of various solvents, by washing, filtration, etc. Additional directions for this phosgenation reaction can be found in Schnell et al. U.S. Pat. Nos. 2,937,459 and 3,022,272, issued Aug. 22, 1961 and Feb. 20, 1962, respectively, whereby the dihydric compound of formula I is employed in place of the bisphenol-A used in the aforesaid Schnell et al. patents. By reference, these two patents are incorporated into the instant application.

In order that those skilled in the art may better understand how the present invention may be practiced, the following examples are given by way of illustration and not by way of limitation.

The oxygen index (OI) measurements were obtained in accordance with the methods described in U.S. Pat. No. 3,519,697 issued July 7, 1970, and U.S. Pat. No. 3,944,517 issued Mar. 16, 1976, which by reference are made part of the disclosures of the instant application. The percent char at 700° C. in nitrogen (and in air) was determined (see aforesaid U.S. Pat. No. 3,944,517) by the method described by J. A. Parket and E. L. Winkler in NASA Technical Report TR-276 (1967). Finally, the smoke index ($D_m$ corrected) was established (see aforesaid U.S. Pat. No. 3,944,517) pursuant to an article by Loftus et al., ASTM Special Technical Publication 422 (1969), where $D_m$ is the maximum specific optical density corrected for deposit on an optical window. All the foregoing tests, including the oxygen index, char tests, and smoke evolution test referred to above are incorporated by reference into the instant application.

The chlorine terminated polydimethylsiloxane employed in the following examples is prepared as follows: A mixture of 100 parts water and 206 parts of dioxane are added over a 2 hour period to 800 parts of dimethyldichlorosilane. The resulting mixture is stirred and heated to the reflux temperature of the mass until a homogeneous solution is obtained. By fractional distillation in vacuum to a temperature of about 202° C. at 12 mm pressure, one obtains a chlorineterminated siloxane having a calculated average formula,

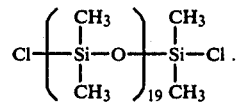

IV

EXAMPLE 1

400 ml dry methylene chloride (dried over activated 4A molecular sieves), 56 ml dry pyridine, and 90 grams phenolphthalein were added to a reactor and while maintaining a temperature of about 25°–30° C. (room temperature) the resulting solution was stirred for 15 minutes while at the same time bubbling nitrogen through the solution. Thereafter, a 400 ml methylene chloride solution containing 10 grams of the siloxane prepared above as formula IV was added dropwise over a period of about 20 minutes. The mixture was then allowed to react with stirring for an additional 30 minutes at ambient temperature (about 30°–40° C.) at which time there was present in the mixture the composition having the formula,

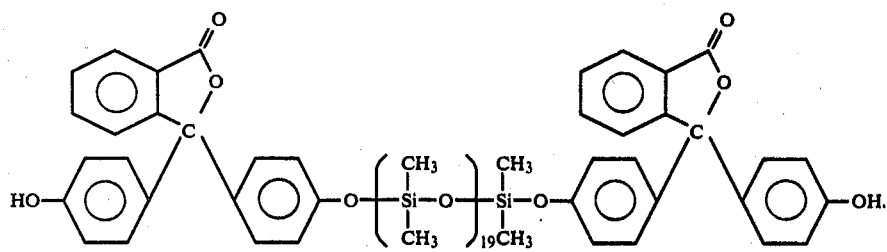

Thereafter, about 110 mol percent (per mol of the compound of formula II) of phosgene was added to the mixture slowly for a period of about 20 minutes. The solution was then purged with nitrogen for about 60 minutes to remove excess phosgene and the resulting polymer was isolated from the solution by precipitating the total reaction solution with a sufficient amount of methanol to precipitate the polymer and thereafter purified by redissolving the polymer in 2 liters methylene chloride, washing it with 5% aqueous HCl, followed by a wash with water, and then drying the polymer solution with anhydrous magnesium sulfate. The filtered polymer solution was then further purified by reprecipitating the polymer from excess methanol. This resulted in copolymeric composition having the formula

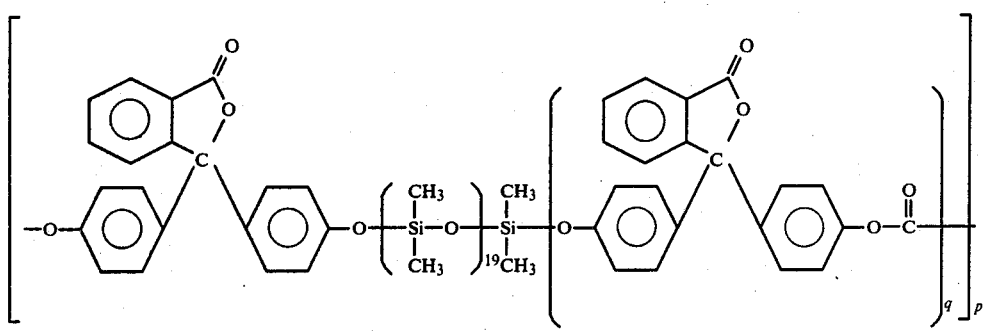

where p and q are independently whole numbers in excess of 1.

The above procedure was repeated almost identically in making a series of copolymers wherein the weight amounts of the dihydricphenol of formula II and the chlorine-terminated polydimethylsiloxanes of formula III were varied. The following Table I shows the amounts of the reagents used to prepare various copolymeric compositions pursuant to the above prescribed general procedure. The copolymers contained units derived from the reactants in essentially the same weight ratio as the starting reactants from which the units were derived.

including the use of films, molding compounds, coatings, etc. When used as films or when made into molded products, these polymers, including laminated products prepared therefrom, not only possess good physical properties at room temperature but they retain their strength and excellent

TABLE II

Properties of Phenolphthalein Siloxane ($D_{20}$) Copolycarbonates

| Sample | OI | Dm | I.V. | Mn | Mw | Mw/Mn | Tensile ($10^3$ psi)[d] Yield | Tensile ($10^3$ psi)[d] Break | % Elongation[d] Yield | % Elongation[d] Break | TGA Air $T_{decomp.}$ | TGA Air [b]% Char | TGA $N_2$ $T_{decomp.}$ | TGA $N_2$ [b]% Char | Tg(°C.) |
|---|---|---|---|---|---|---|---|---|---|---|---|---|---|---|---|
| 100/0 | 42* | 98* | .43 | — | — | — | 9.6 | 9.6 | 13% | 13% | 410° C. | 0% | 390° C. | 52% | 259 |
| I 90/10 | 37 | 161 | .40 | 26,885 | 63,125 | 2.35 | 8.4 | 8.4 | 5% | 23% | 418° C. | 4% | 446° C. | 52% | ~250 |
| II 75/25 | 37 | 176 | .44 | 27,453 | 68,068 | 2.48 | 6.8 | 7.3 | 5% | 45% | 421° C. | 11% | 452° C. | 54% | ~230 |
| III 50/50 | 35 | 133 | .28 | 19,082 | 59,003 | 3.09 | 2.9 | 3.3 | 7% | 86% | 389° C. | 26% | 395° C. | 34% | c |
| 0/100[a] | 22 | ~100 | — | — | — | — | — | — | — | — | 350° C. | 20% | 450° C. | 7% | — |

[a] Unfilled crosslinked rubber.
[b] % Char - residue at 700° C.
[c] Tg not observable.
[d] Values obtained from cast films.
*1/8" test parts were prepared by compression molding of 20 films which were prepared by solvent casting from methylene chloride solution.

TABLE I

| Test No. | Wt. of Compound Formula II | Wt. of Compound Formula III |
|---|---|---|
| 1 | 90 grams | 10 grams |
| 2 | 75 grams | 25 grams |
| 3 | 50 grams | 50 grams |

It will be noted from an examination of Table II that the presence of 10-25 wt. percent of the dimethylsiloxy moiety gave materials with excellent flame resistance and physical properties and additionally they were easily processed. The compositions containing a high proportion of the phenolphthalein nucleus are useful as panels and glazing for public vehicles, e.g., airplanes, trains, buses, etc., while the compositions containing a high proportion of silicone, e.g., greater than 50% are useful where more leathery or rubberlike properties are required in conjunction with flame resistance, e.g., seal covers, foam cushions, door seals, interlaminar material, etc.

Compositions of the present invention have application in a wide variety of physical shapes and forms, response to workloading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommend these resins include their use as binders for asbestos fibers, carbon fibers, and other fibrous materials in making brakelinings. In addition, molding compositions and molded articles may be formed from the polymeric compositions in this invention by incorporating fillers such as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

The compositions herein defined may be suitably incorporated with other materials to modify the properties of the latter or in turn they may be modified by the incorporation of the materials, for example, they may be compounded with substances such as natural or synthetic rubbers, synthetic resins such as phenolaldehyde resins, alkyd resins, etc., cellulosic materials such as paper, organic esters of cellulose such as cellulose acetate, cellulose ether; etc. Because of the favorable oxygen index and low smoke index, the incorporation of these polymers in other polymers which may not be so favorably disposed, for instance, other types of polycarbonate resins, polyphenylene oxide resins, polybutylene terephalate resins, etc., in amounts ranging from 5 to 75 percent, by weight, based on the total weight of the compositions herein described and the aforesaid resins, can improve the properties of the resins in which the copolymer compositions of the present invention are incorporated.

The compositions herein described are generally of a thermoplastic nature. However, they may be made thermoset by heating at elevated temperature of about 125°–175° C., in the presence of certain cure accelerators, such as organic peroxides, e.g., benzoyl peroxide, dicumyl peroxide, tertiary butyl hydroperoxide, etc. As a result of conversion to the thermostet stage, particularly in copolymeric compositions having reinforcing fillers incorporated therein, molded products can be obtained which have increased tensile strengths. The introduction of vinyl siloxy units, e.g.,

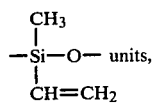

will further contribute to improvements in obtaining cross-linked products.

What we claim as new and desire to secure by Letters Patent of the United States is:

1. A composition of matter comprising units of the general formula

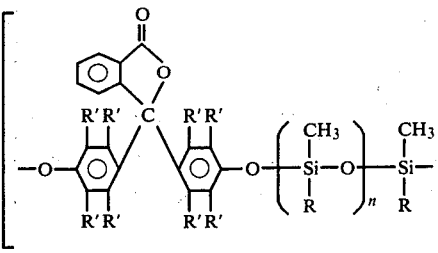

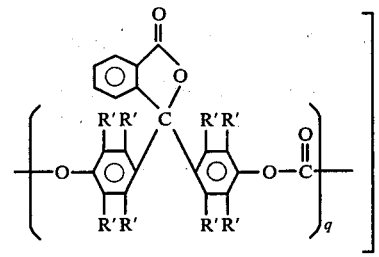

where R is independently selected from the lower alkyl radicals of from 1 to 3 carbon atoms and the phenyl radical, R' is independently selected from H, an alkyl radical having from 1 to 4 carbon atoms inclusive, chlorine, bromine, iodine and nitro, and n and q independently are whole numbers equal to at least 1.

2. A composition of matter comprising units of the formula

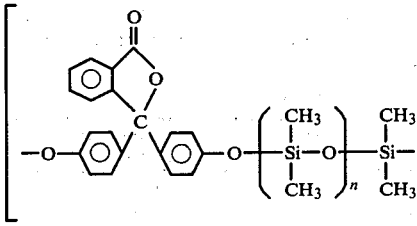

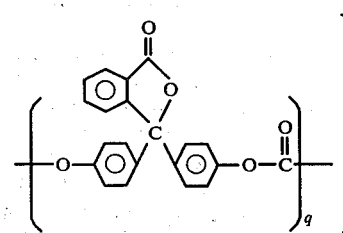

where n and q independently are whole numbers equal to at least 1.

3. A composition of matter comprising units of the formula

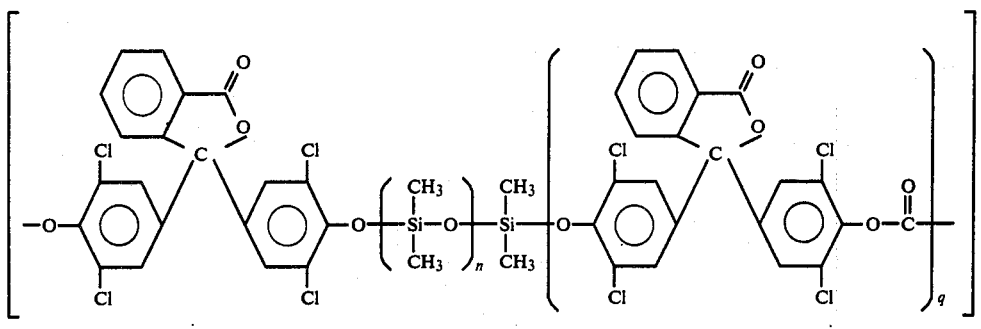

where n and q independently are whole numbers equal to at least 1.

4. A composition of matter comprising units of the formula

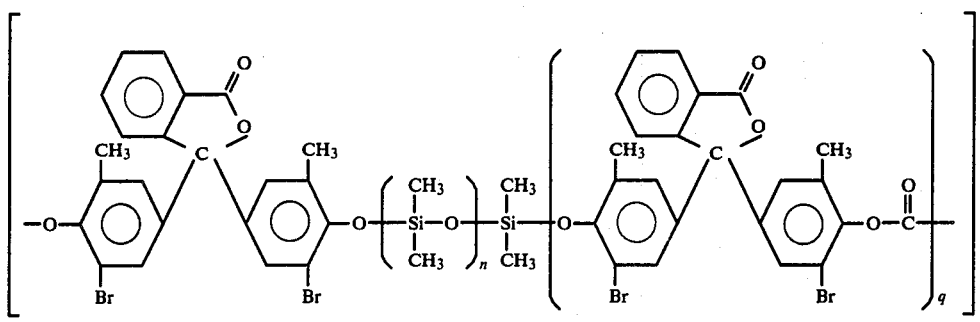

where n and q independently are whole numbers equal to at least 1.

5. A composition of matter comprising units of the formula

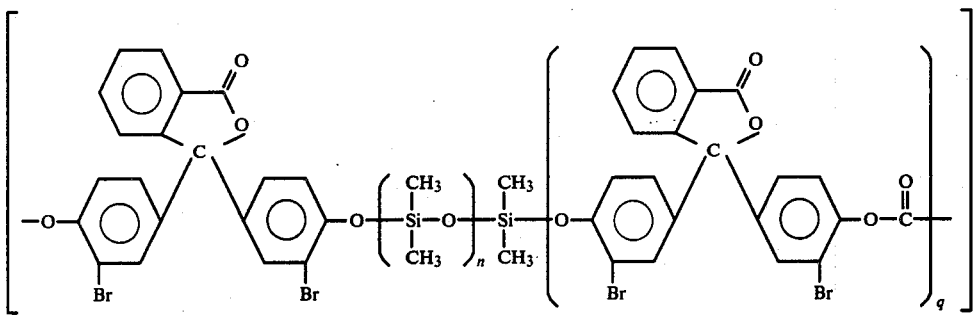

where n and q independently are whole numbers equal to or in excess of 1.

6. A composition of matter comprising units of the formula

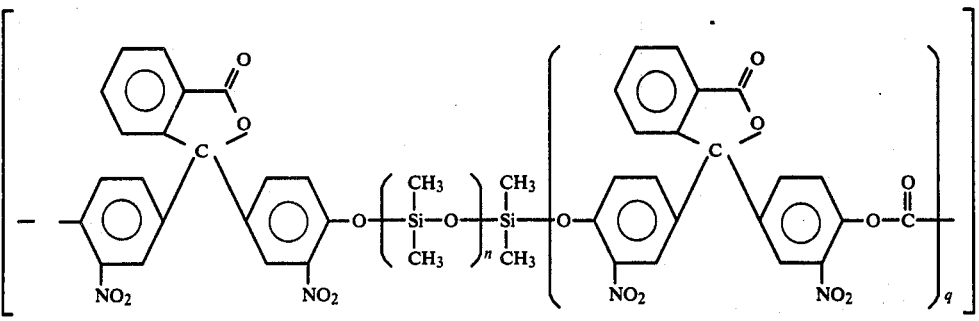

where n and q independently are whole numbers equal to or in excess of 1.

* * * * *